US012482971B2

(12) United States Patent
Tsukamoto et al.

(10) Patent No.: US 12,482,971 B2
(45) Date of Patent: Nov. 25, 2025

(54) CONNECTOR INCLUDING A RESIN BODY MEMBER, SIGNAL TERMINALS AND A GROUND TERMINAL

(71) Applicant: Murata Manufacturing Co., Ltd., Kyoto-fu (JP)

(72) Inventors: Hideki Tsukamoto, Nagaokakyo (JP); Yuma Amemori, Nagaokakyo (JP); Yuuto Morita, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 344 days.

(21) Appl. No.: 18/146,260

(22) Filed: Dec. 23, 2022

(65) Prior Publication Data

US 2023/0246388 A1 Aug. 3, 2023

(30) Foreign Application Priority Data

Jan. 31, 2022 (JP) ................................ 2022-012630

(51) Int. Cl.

*H01R 12/71* (2011.01)
*H01R 13/516* (2006.01)
*H01R 13/6471* (2011.01)

(52) U.S. Cl.

CPC ......... *H01R 12/716* (2013.01); *H01R 13/516* (2013.01); *H01R 13/6471* (2013.01)

(58) Field of Classification Search

CPC ....... H01R 24/60; H01R 12/73; H01R 12/716
USPC .............................................. 439/74, 65, 66
See application file for complete search history.

(56) References Cited

U.S. PATENT DOCUMENTS 7,172,434 B2 * 2/2007 Obikane ................ H01R 24/60 439/570
8,257,095 B2 * 9/2012 Akai .................. H01R 13/6315 439/74
9,300,064 B2 * 3/2016 Takenaga ............. H01R 12/716
9,362,637 B2 * 6/2016 Hasegawa .............. H01R 12/73
9,391,398 B2 * 7/2016 Omodachi ........... H01R 12/707
9,666,963 B2 * 5/2017 He ......................... H01R 12/73
9,899,771 B2 * 2/2018 Ashibu .................. H01R 13/50
(Continued)

FOREIGN PATENT DOCUMENTS

CN 209544656 U 10/2019
JP 2006-331679 A 12/2006
(Continued)

*Primary Examiner* — Marcus E Harcum
(74) *Attorney, Agent, or Firm* — Studebaker Brackett PLLC

(57) ABSTRACT

A connector includes a resin member which includes a protruding portion extending in a right and left direction when viewed in an up and down direction, a frame portion having an annular shape surrounding the protruding portion when viewed in the up and down direction, and a coupling portion between the protruding portion and the frame portion when viewed in the up and down direction and coupling the protruding portion to the frame portion. A plurality of signal terminals is supported by the frame portion and arranged in the right and left direction in a region in front of or in back of the protruding portion. The floating terminal covers at least part of a left end of the protruding portion when viewed in the up and down direction and is not connected to any of terminals of a connector, including the signal terminals and a ground terminal.

8 Claims, 8 Drawing Sheets

(56) References Cited

U.S. PATENT DOCUMENTS

| | | | | |
|---|---|---|---|---|
| 10,249,969 | B2 * | 4/2019 | Ono | H01R 13/504 |
| 10,333,239 | B2 * | 6/2019 | Ashibu | H01R 12/707 |
| 11,095,059 | B2 * | 8/2021 | Gondo | H01R 13/502 |
| 11,158,968 | B2 * | 10/2021 | Tanaka | H01R 13/631 |
| 11,228,149 | B2 * | 1/2022 | Sloey | H01R 24/50 |
| 11,652,323 | B2 * | 5/2023 | Oosaka | H01R 13/6585 439/607.08 |
| 11,916,323 | B2 * | 2/2024 | Maeda | H05K 1/0225 |
| 12,160,071 | B2 * | 12/2024 | Okubo | H01R 24/60 |
| 2013/0330943 | A1 * | 12/2013 | Sasaki | H01R 12/716 439/74 |
| 2018/0198241 | A1 * | 7/2018 | Ooi | H01R 13/6597 |
| 2020/0127400 | A1 * | 4/2020 | Sasayama | H01R 4/02 |
| 2020/0244011 | A1 * | 7/2020 | Kitazawa | H01R 13/6585 |
| 2020/0343660 | A1 * | 10/2020 | Gondo | H01R 12/716 |
| 2021/0005993 | A1 * | 1/2021 | Yanase | H01R 13/193 |
| 2021/0175665 | A1 * | 6/2021 | Someya | H01R 13/6471 |
| 2023/0261400 | A1 * | 8/2023 | Tsunemura | H01R 13/46 439/74 |
| 2024/0162640 | A1 * | 5/2024 | Tsunemura | H01R 13/502 |

FOREIGN PATENT DOCUMENTS

| | | | |
|---|---|---|---|
| JP | 2018-190642 | A | 11/2018 |
| JP | 2022-143509 | A | 10/2022 |
| JP | 2023-034689 | A | 3/2023 |

* cited by examiner

10

CONNECTOR INCLUDING A RESIN BODY MEMBER, SIGNAL TERMINALS AND A GROUND TERMINAL

CROSS-REFERENCE TO RELATED APPLICATION

This application claims benefit of priority to Japanese Patent Application No. 2022-012630, filed Jan. 31, 2022, the entire content of which is incorporated herein by reference.

BACKGROUND

Technical Field

The present disclosure relates to a connector.

Background Art

For example, a receptacle connector described in Japanese Unexamined Patent Application Publication No. 2006-331679 is known as an disclosure related to an existing connector. The receptacle connector includes a receptacle housing, a plurality of receptacle contacts, and a receptacle member. The receptacle housing is a resin member. The receptacle housing includes a receptacle fitting portion and a receptacle outer wall portion. The receptacle fitting portion extends in a right and left direction. When viewed in an up and down direction, the receptacle outer wall portion surrounds the receptacle fitting portion. Each of the plurality of receptacle contacts is a signal terminal. The plurality of receptacle contacts is supported by the receptacle housing. The receptacle member is a ground terminal. The receptacle member includes a first supported portion supported by the left end of the receptacle fitting portion and a second supported portion supported by the left end of the receptacle outer wall portion. The first supported portion and the second supported portion are coupled to each other.

Incidentally, it is desired that the receptacle connector described in Japanese Unexamined Patent Application Publication No. 2006-331679 be used in a high frequency band.

SUMMARY

The present disclosure provides a connector that can be used in a high frequency band.

A connector according to an aspect of the present disclosure includes a resin body member, a plurality of signal terminals supported by the resin body member, a ground terminal supported by the resin body member, and a floating terminal supported by the resin body member. The resin body member includes a protruding portion extending in a right and left direction when viewed in an up and down direction, a frame portion having an annular shape surrounding the protruding portion when viewed in the up and down direction, and a coupling portion located between the protruding portion and the frame portion when viewed in the up and down direction, the coupling portion coupling the protruding portion to the frame portion. The plurality of signal terminals is supported by the frame portion so as to be arranged in the right and left direction in a region in front of or in back of the protruding portion. The floating terminal covers at least part of a left end of the protruding portion when viewed in the up and down direction and is not connected to any of terminals of the connector, including the plurality of signal terminals and the ground terminal. The ground terminal is supported by the frame portion so as to be opposed to the floating terminal in a front and rear direction or in the right and left direction.

Hereinafter, a positional relationship among members in the specification will be defined. A first member to a third member are components of a connector set. In the specification, the first member and the second member arranged in a front and rear direction represent the following state. This is a state where, when the first member and the second member are viewed in a direction perpendicular to the front and rear direction, both the first member and the second member are disposed on a selected straight line representing the front and rear direction. In the specification, the first member and the second member arranged in the front and rear direction when viewed in an up and down direction represent the following state. When the first member and the second member are viewed in the up and down direction, both the first member and the second member are disposed on a selected straight line representing the front and rear direction. In this case, when the first member and the second member are viewed in a right and left direction different from the up and down direction, any one of the first member and the second member does not need to be disposed on a selected straight line representing the front and rear direction. The first member and the second member may be in contact with each other. The first member and the second member may be separated from each other. The third member may be present between the first member and the second member. This definition also applies to directions other than the front and rear direction.

In the specification, a state where the first member is disposed on or over the second member means the following state. At least part of the first member is located just on or over the second member. Therefore, when viewed in the up and down direction, the first member overlaps the second member. This definition also applies to directions other than the up and down direction.

In the specification, a state where the first member is disposed on or above the second member includes a case where at least part of the first member is located just on or over the second member and a case where the first member is not located just on or over the second member and the first member is located obliquely above the second member. In this case, when viewed in the up and down direction, the first member does not need to overlap the second member. The term "obliquely above" includes, for example, upper left and upper right. This definition also applies to directions other than the up and down direction.

In the specification, unless otherwise specified, parts of the first member are defined as follows. A front part of the first member means a front half of the first member. A rear part of the first member means a rear half of the first member. A left part of the first member means a left half of the first member. A right part of the first member means a right half of the first member. An upper part of the first member means an upper half of the first member. A lower part of the first member means a lower half of the first member. A front end of the first member means a forward end of the first member. A rear end of the first member means a rearward end of the first member. A left end of the first member means a leftward end of the first member. A right end of the first member means a rightward end of the first member. An upper end of the first member means an upward end of the first member. A lower end of the first member means a downward end of the first member. A front end part of the first member means the front end of the first member and its neighborhood. A rear end part of the first member means the rear end of the first member and its neighborhood.

A left end part of the first member means the left end of the first member and its neighborhood. A right end part of the first member means the right end of the first member and its neighborhood. An upper end part of the first member means the upper end of the first member and its neighborhood. A lower end part of the first member means the lower end of the first member and its neighborhood.

When selected two members in the specification are defined as the first member and the second member, the relationship between the selected two members means as follows. In the specification, a state where the first member is supported by the second member includes a case where the first member is attached to (that is, fixed to) the second member so as to be not movable with respect to the second member and a case where the first member is attached to the second member so as to be movable with respect to the second member. A state where the first member is supported by the second member includes both a case where the first member is directly attached to the second member and a case where the first member is attached to the second member via the third member.

In the specification, a state where the first member is held by the second member includes a case where the first member is attached to (that is, fixed to) the second member so as to be not movable with respect to the second member and does not include a case where the first member is attached to the second member so as to be movable with respect to the second member. A state where the first member is held by the second member includes both a case where the first member is directly attached to the second member and a case where the first member is attached to the second member via the third member.

In the specification, the phrase "the first member and the second member are electrically connected" means that the first member and the second member are electrically continuous. Therefore, the first member and the second member may be in contact with each other or the first member and the second member do not need to be in contact with each other. When the first member and the second member are not in contact with each other, the third member having electrical conductivity is disposed between the first member and the second member.

DETAILED DESCRIPTION

Figure 1:
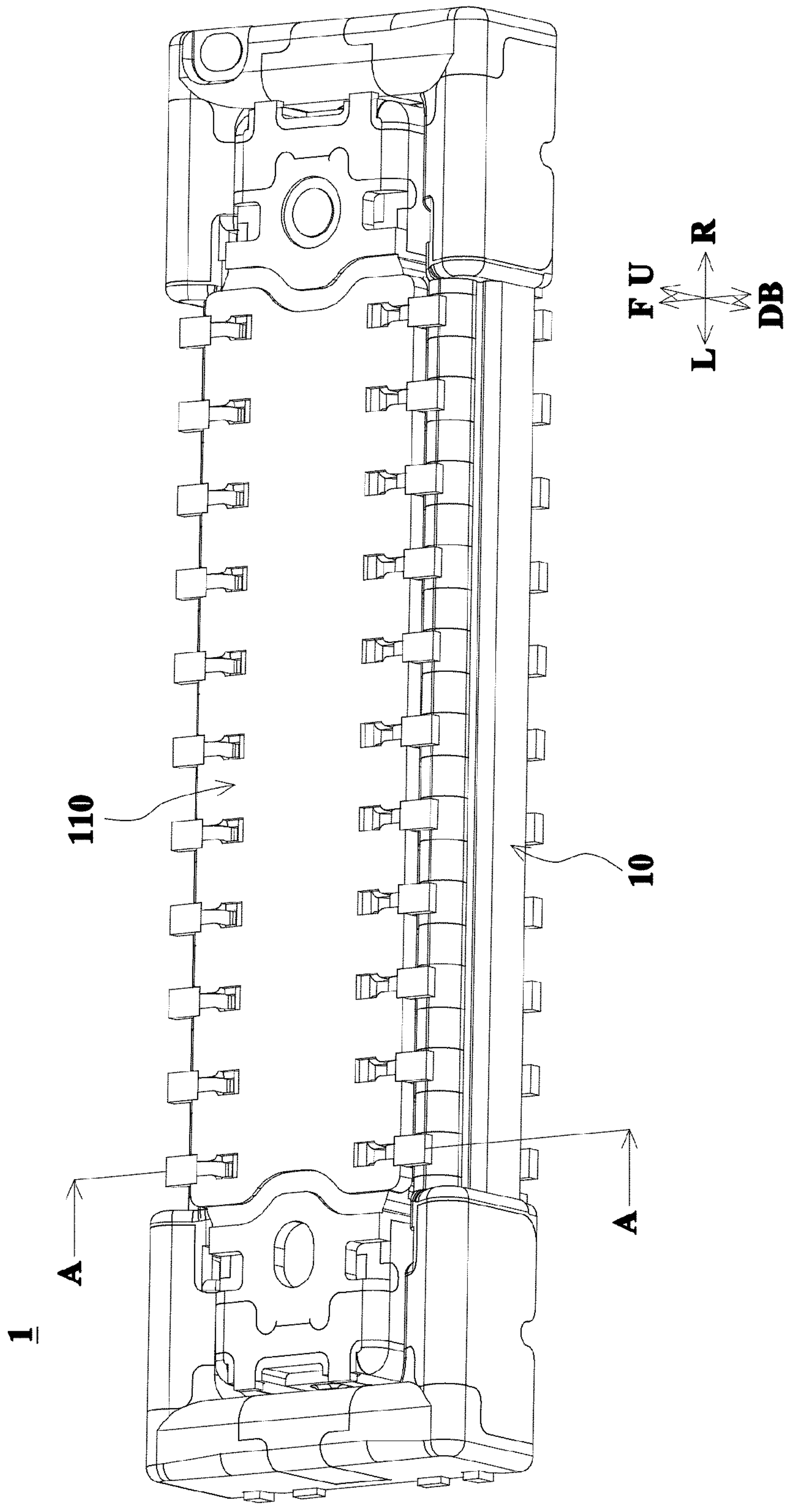
FIG. 1 is a perspective view of a connector set 1.

Hereinafter, a connector set 1 including a first connector 10 according to an embodiment of the present disclosure will be described. FIG. 1 is a perspective view of the connector set 1.

In the following description, as shown in FIG. 1, a direction in which a second connector 110 and the first connector 10 are arranged is defined as an up and down direction. A direction in which signal terminals 13*a* to 13*v* (see FIG. 2) are arranged in the first connector 10 is defined as a right and left direction. The right and left direction is orthogonal to the up and down direction. A direction orthogonal to the right and left direction and the up and down direction is defined as a front and rear direction. However, the up and down direction, the right and left direction, and the front and rear direction in the specification are directions defined for the sake of convenience of description and do not need to coincide with an up and down direction, a right and left direction, and a front and rear direction during use of the connector set 1.

The connector set 1 is, for example, used to connect two circuit boards. The connector set 1 includes the first connector 10 and the second connector 110. When the first connector 10 and the second connector 110 are connected, the second connector 110 is located on or over the first connector 10.

Structure of First Connector

Figure 2:
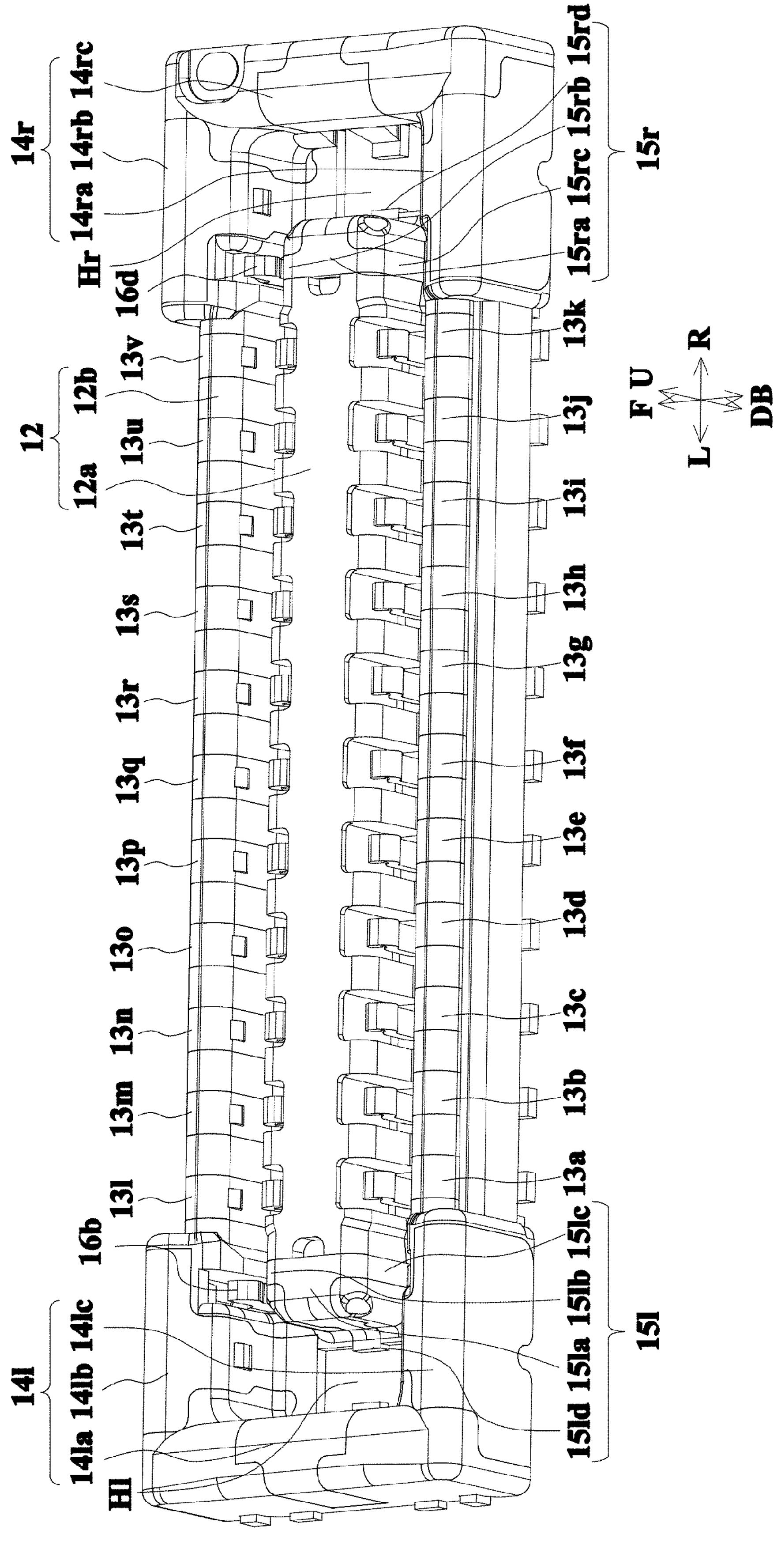
FIG. 2 is a perspective view of a first connector 10.
Figure 3:
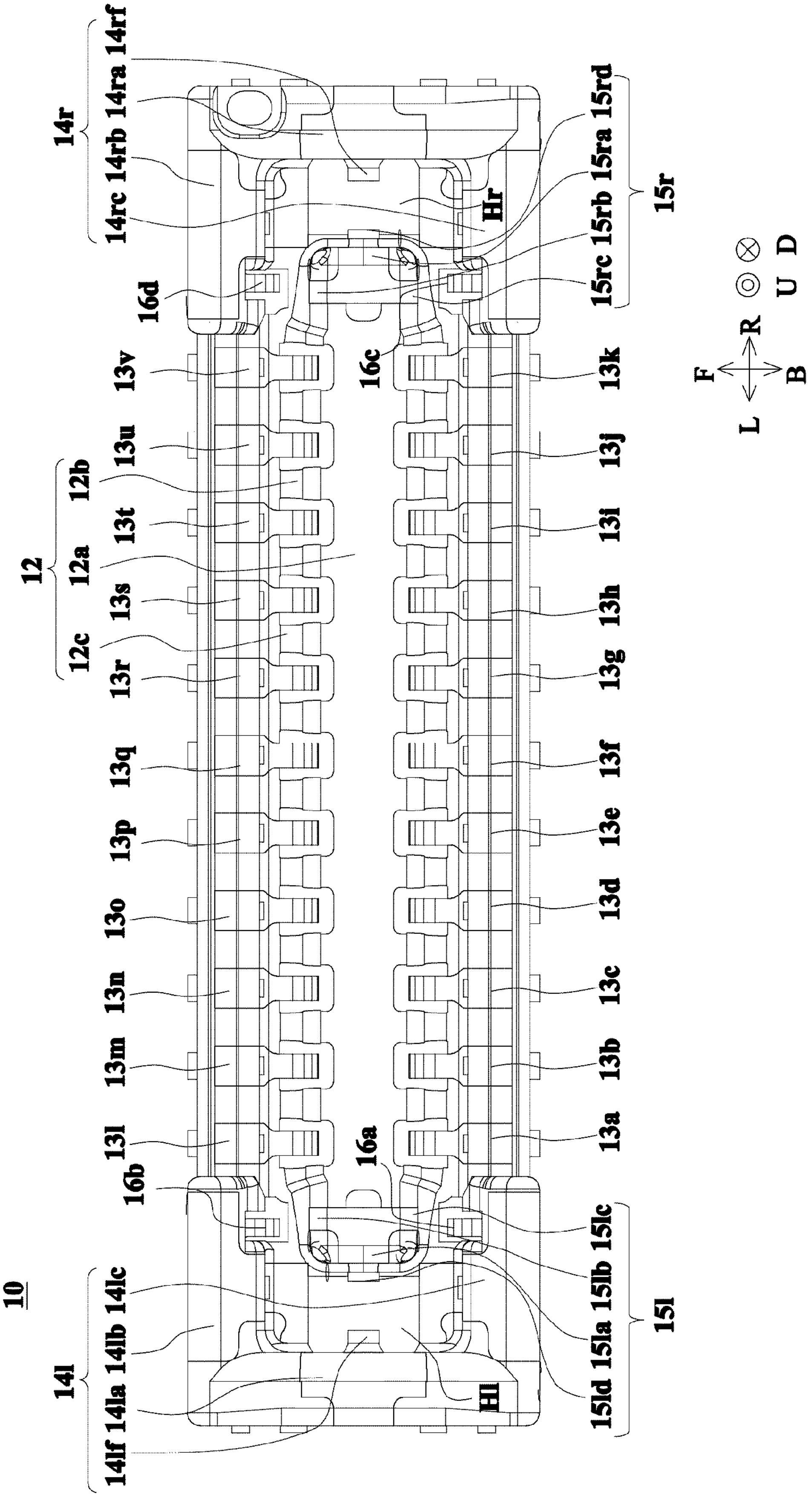
FIG. 3 is a top view of the first connector 10.
Figure 4:
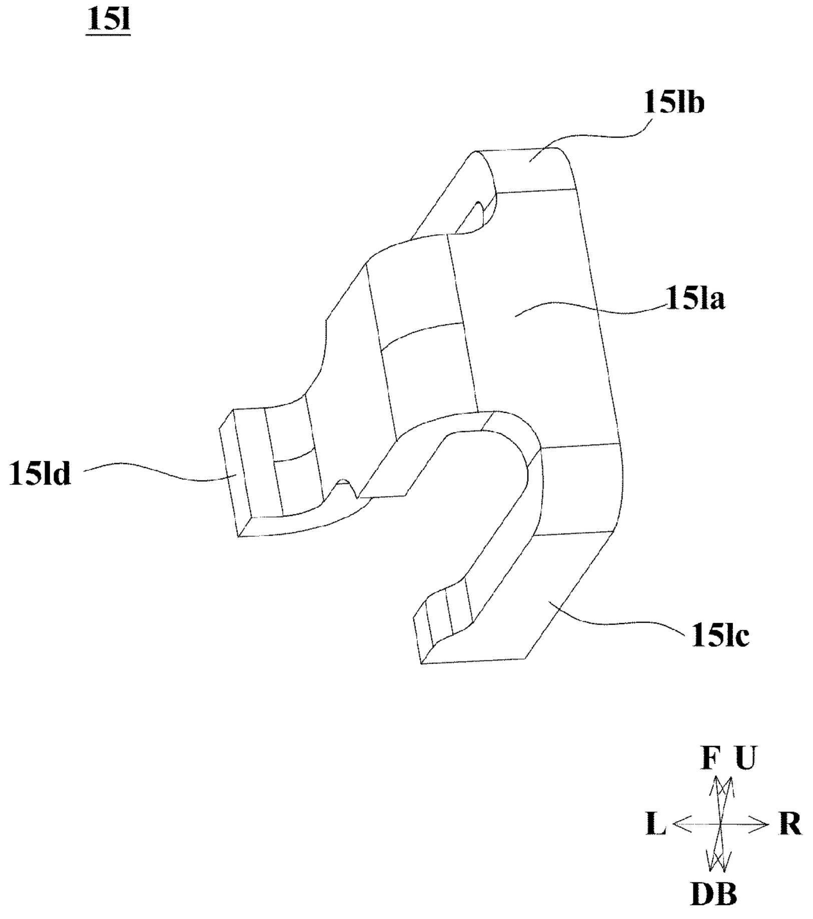
FIG. 4 is a perspective view of a floating terminal 15*l*.
Figure 5:
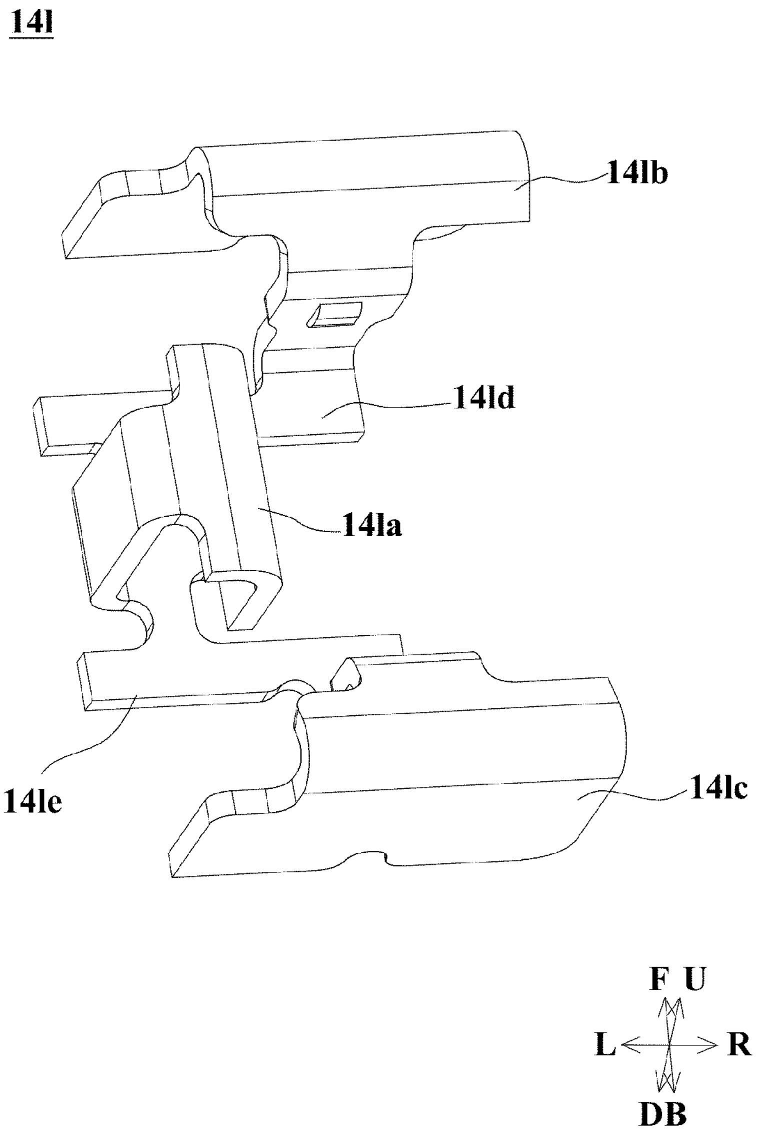
FIG. 5 is a perspective view of a ground terminal 14*l*.
Figure 6:
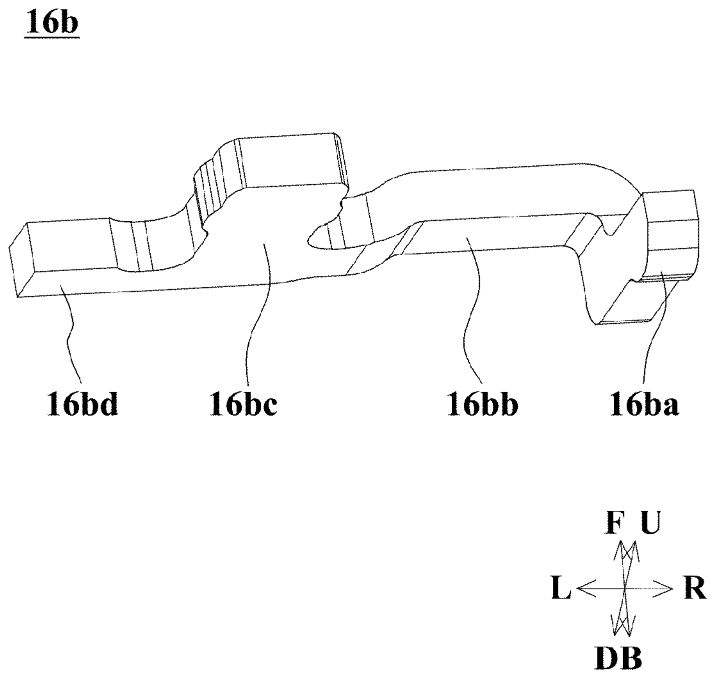
FIG. 6 is a perspective view of a ground terminal 16*b*.

Next, the structure of the first connector 10 will be described. FIG. 2 is a perspective view of the first connector 10. FIG. 3 is a top view of the first connector 10. FIG. 4 is a perspective view of a floating terminal 15*l*. FIG. 5 is a perspective view of a ground terminal 14*l*. FIG. 6 is a perspective view of a ground terminal 16*b*.

As shown in FIGS. 2 and 3, the first connector 10 includes a resin body member 12, signal terminals 13*a* to 13*v*, ground terminals 14*l*, 14*r*, floating terminals 15*l*, 15*r*, and ground terminals 16*a* to 16*d*.

As shown in FIG. 2, the resin body member 12 includes a protruding portion 12*a*, a frame portion 12*b*, and a coupling portion 12*c* (see FIG. 3). When viewed in the up and down direction, the protruding portion 12*a* extends in the right and left direction. More specifically, the protruding portion 12*a* has a rectangular parallelepiped shape. When viewed in the up and down direction, the protruding portion 12*a* has two long sides extending in the right and left direction and two short sides extending in the front and rear direction.

When viewed in the up and down direction, the frame portion 12*b* has an annular shape surrounding the protruding portion 12*a*. More specifically, when viewed in the up and down direction, the frame portion 12*b* has a rectangular outer edge and a rectangular inner edge. When viewed in the up and down direction, each of the outer edge of the frame portion 12*b* and the inner edge of the frame portion 12*b* has two long sides extending in the right and left direction and two short sides extending in the front and rear direction. When viewed in the up and down direction, the protruding portion 12*a* is located in a region surrounded by the inner edge of the frame portion 12*b*. The protruding portion 12*a* is not in contact with the frame portion 12*b*.

As shown in FIG. 3, when viewed in the up and down direction, the coupling portion 12*c* is located between the protruding portion 12*a* and the frame portion 12*b* and couples the protruding portion 12*a* to the frame portion 12*b*. In the present embodiment, the coupling portion 12*c* couples the lower part of the protruding portion 12*a* to the lower part of the frame portion 12*b*. The material of the resin body member 12 is an electrically insulating material. The material of the resin body member 12 is, for example, a resin.

A radio-frequency signal is input to and output from each of the signal terminals 13*a* to 13*v*. The signal terminals 13*a* to 13*v* are supported by the resin body member 12. More specifically, part of each of the signal terminals 13*a* to 13*k* is embedded in the rear side of the frame portion 12*b*. Thus, the signal terminals 13*a* to 13*k* are supported by the frame portion 12*b* so as to be arranged in the right and left direction in a region in back of the protruding portion 12*a*. The signal terminals 13*a* to 13*k* are arranged in a line in this order from the left to the right. Part of each of the signal terminals 13*l* to 13*v* is embedded in the front side of the frame portion 12*b*. The signal terminals 13*l* to 13*v* are supported by the frame portion 12*b* so as to be arranged in the right and left direction in a region in front of the protruding portion 12*a*. The signal terminals 13*l* to 13*v* are respectively located in front of the signal terminals 13*a* to 13*k*. The signal terminals 13*l* to 13*v* are arranged in a line in this order from the left to the right. Each of the signal terminals 13*a* to 13*k* is manufactured by bending a rod metal member. The material of the signal terminals 13*a* to 13*k* is, for example, a copper-based material, such as phosphor bronze.

The floating terminal 15*l* is not connected to any of the terminals of the first connector 10, including the signal terminals 13*a* to 13*v* and the ground terminals 14*l*, 14*r* (details will be described later). Therefore, the potential of the floating terminal 15*l* is a floating potential. The floating terminal 15*l* is supported by the resin body member 12. As shown in FIGS. 2 and 3, when viewed in the up and down direction, the floating terminal 15*l* covers at least part of the left end of the protruding portion 12*a*. As shown in FIG. 4, the floating terminal 15*l* includes a first part 15*la*, a second part 15*lb*, a third part 15*lc*, and a floating protrusion 15*ld*. The first part 15*la* is located on the top surface and the left surface of the protruding portion 12*a*. More accurately, the first part 15*la* covers part of the left end of the top surface of the protruding portion 12*a* and part of the left surface of the protruding portion 12*a*. The second part 15*lb* is located on the front surface of the protruding portion 12*a*. More accurately, the second part 15*lb* extends in the forward direction from the first part 15*la*. The second part 15*lb* covers part of the left end of the front surface of the protruding portion 12*a*. The third part 15*lc* is located on the rear surface of the protruding portion 12*a*. More accurately, the third part 15*lc* extends in the rearward direction from the first part 15*la*. The third part 15*lc* covers part of the left end of the rear surface of the protruding portion 12*a*.

Here, the first part 15*la* and the second part 15*lb* are coupled on the top surface of the protruding portion 12*a*. Therefore, the first part 15*la* and the second part 15*lb* are not coupled on the left surface or the front surface of the protruding portion 12*a*. The first part 15*la* and the third part 15*lc* are coupled on the top surface of the protruding portion 12*a*. Therefore, the first part 15*la* and the third part 15*lc* are not coupled on the left surface or the rear surface of the protruding portion 12*a*. In addition, the width of the first part 15*la* in the front and rear direction is greater than any of the width of the second part 15*lb* in the right and left direction and the width of the third part 15*lc* in the right and left direction.

The floating protrusion 15*ld* extends in the leftward direction from the lower end of the first part 15*la*. The width of the first part 15*la* in the front and rear direction is greater than the width of the floating protrusion 15*ld* in the front and rear direction. The floating terminal 15*l* is manufactured by bending a metal member. The material of the floating terminal 15*l* is, for example, a copper-based material, such as phosphor bronze. The structure of the floating terminal 15*r* and the structure of the floating terminal 15*l* are bilaterally symmetrical, so the description of the structure of the floating terminal 15*r* is omitted.

The ground terminal 14*l* is connected to a ground potential. The ground terminal 14*l* is supported by the resin body member 12. Specifically, the ground terminal 14*l* is supported by the frame portion 12*b* so as to be opposed to the floating terminal 15*l* in the front and rear direction and in the right and left direction. Hereinafter, the structure of the ground terminal 14*l* will be described.

As shown in FIG. 5, the ground terminal 14*l* includes a first part 14*la*, a second part 14*lb*, a third part 14*lc*, connecting parts 14*ld*, 14*le*, and a ground protrusion 14*lf* (see FIGS. 2 and 3). The first part 14*la* is provided on the left surface, the top surface, and the right surface of the left side of the frame portion 12*b*. As shown in FIG. 2, part of the first part 14*la* is embedded in the left side of the frame portion 12*b*. Thus, the first part 14*la* is opposed to the floating terminal 15*l* in the right and left direction. The second part 14*lb* is provided on the front surface, the top surface, and the rear surface of the left end of the front side of the frame portion 12*b*. Part of the second part 14*lb* is embedded in the front side of the frame portion 12*b*. Thus, the second part 14*lb* is opposed to the floating terminal 15*l* in the front and rear direction. The third part 14*lc* is provided on the front surface, the top surface, and the rear surface of the left end of the rear side of the frame portion 12*b*. Part of the third part 14*lc* is embedded in the rear side of the frame portion 12*b*. Thus, the third part 14*lc* is opposed to the floating terminal 15*l* in the front and rear direction.

The connecting part 14*ld* couples the first part 14*la* to the second part 14*lb*. The connecting part 14*le* couples the first part 14*la* to the third part 14*lc*. The ground protrusion 14*lf* extends in the rightward direction from the lower end of the first part 14*la*. The ground terminal 14*l* is manufactured by bending a metal member. The material of the ground terminal 14*l* is, for example, a copper-based material, such as phosphor bronze. The structure of the ground terminal 14*r* and the structure of the ground terminal 14*l* are bilaterally symmetrical, so the description of the structure of the ground terminal 14*r* is omitted.

The ground terminal 16*b* is connected to a ground potential. The ground terminal 16*b* is supported by the resin body member 12. In the present embodiment, the ground terminal 16*b* is supported by the left front part of the resin body member 12. As shown in FIG. 6, the ground terminal 16*b* includes a contact part 16*ba*, a spring part 16*bb*, a fixing part 16*bc*, and an external connecting part 16*bd*. The spring part 16*bb*, the fixing part 16*bc*, and the external connecting part 16*bd* are arranged in this order from the right to the left. The external connecting part 16*bd* is a part to which solder is applied when the first connector 10 is mounted on the circuit board. The fixing part 16*bc* is embedded in the resin body member 12.

The spring part 16*bb* is not supported by the resin body member 12. Therefore, the spring part 16*bb* is elastically deformable so as to deflect in the front and rear direction. The contact part 16*ba* extends in the rearward direction from the right end of the spring part 16*bb*. The ground terminal 16*b* is manufactured by bending a metal member. The material of the ground terminal 16*b* is, for example, a copper-based material, such as phosphor bronze. The structure of the ground terminal 16*a* and the structure of the ground terminal 16*b* are symmetrical in the front and back, so the description of the structure of the ground terminal 16*a* is omitted. The structure of the ground terminal 16*d* and the structure of the ground terminal 16*b* are bilaterally symmetrical, so the description of the structure of the ground terminal 16*d* is omitted. The structure of the ground terminal 16*c* and the structure of the ground terminal 16*a* are bilaterally symmetrical, so the description of the structure of the ground terminal 16*c* is omitted.

As shown in FIG. 3, in the first connector 10 as described above, when viewed in the up and down direction, a through-hole H1 extending through the coupling portion 12*c* in the up and down direction is provided in at least part of a region between the first part 14*la* and the floating terminal 15*l*. When viewed in the up and down direction, the ground protrusion 14*lf* protrudes into the through-hole H1. When viewed in the up and down direction, the floating protrusion 15*ld* protrudes into the through-hole H1. The ground protrusion 14*lf* and the floating protrusion 15*ld* are arranged in the right and left direction. The structure of a through-hole Hr and the structure of the through-hole H1 are bilaterally symmetrical, so the description of the structure of the through-hole Hr is omitted.

The first connector 10 as described above is mounted on the circuit board. At this time, parts of the signal terminals 13*a* to 13*v*, ground terminals 14*l*, 14*r*, floating terminals 15*l*, 15*r*, and ground terminals 16*a* to 16*d* are exposed from the bottom surface of the resin body member 12. Solder is applied to each of these parts. Thus, the signal terminals 13*a* to 13*v*, the ground terminals 14*l*, 14*r*, the floating terminals 15*l*, 15*r*, and the ground terminals 16*a* to 16*d* are respectively connected to the electrodes of the circuit board.

Structure of Second Connector

Figure 7:
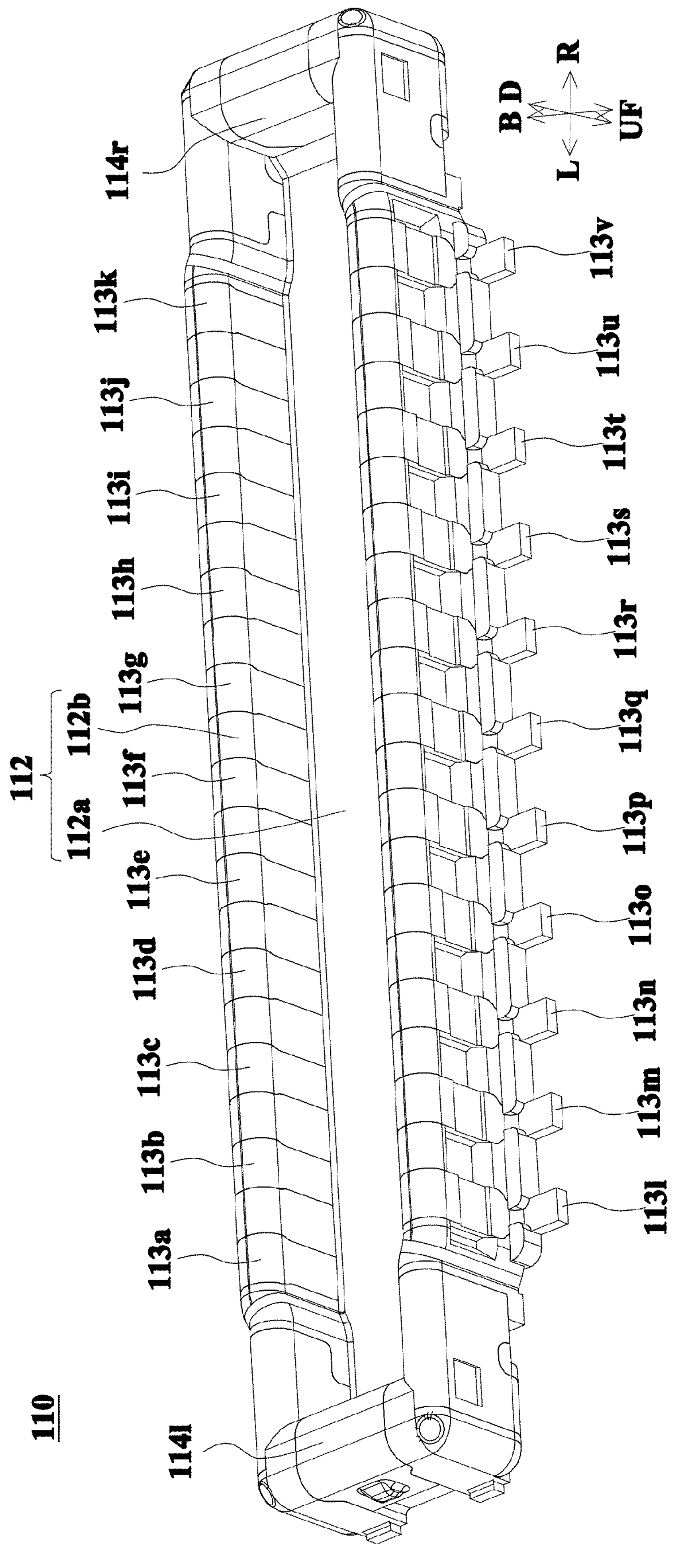
FIG. 7 is a perspective view of a second connector 110.

Next, the structure of the second connector 110 will be described. FIG. 7 is a perspective view of the second connector 110. FIG. 7 is a perspective view of the second connector 110.

As shown in FIG. 7, the second connector 110 includes a resin body member 112, signal terminals 113*a* to 113*v*, and ground terminals 114*l*, 114*r*.

The resin body member 112 includes a bottom portion 112*a* and a frame portion 112*b*. When viewed in the up and down direction, the frame portion 112*b* has an annular shape. More specifically, when viewed in the up and down direction, the frame portion 112*b* has a rectangular outer edge and a rectangular inner edge. When viewed in the up and down direction, each of the outer edge of the frame portion 112*b* and the inner edge of the frame portion 112*b* has two long sides extending in the right and left direction and two short sides extending in the front and rear direction. As shown in FIG. 7, when viewed in the up and down direction, the bottom portion 112*a* closes the top surface of a region surrounded by the frame portion 112*b*. The material of the resin body member 112 is an electrically insulating material. The material of the resin body member 112 is, for example, a resin.

A radio-frequency signal is input to and output from each of the signal terminals 113*a* to 113*v*. The signal terminals 113*a* to 113*v* are supported by the resin body member 112. More specifically, part of each of the signal terminals 113*a* to 113*k* is embedded in the rear side of the frame portion 112*b*. The signal terminals 113*a* to 113*k* are arranged in a line in this order from the left to the right. Part of each of the signal terminals 113*l* to 113*v* is embedded in the front side of the frame portion 112*b*. The signal terminals 113*l* to 113*v* are respectively located in front of the signal terminals 113*a* to 113*k*. The signal terminals 113*l* to 113*v* are arranged in a line in this order from the left to the right. Each of the signal terminals 113*a* to 113*k* is manufactured by bending a rod metal member. The material of the signal terminals 113*a* to 113*k* is, for example, a copper-based material, such as phosphor bronze.

The ground terminal 114*l* is connected to a ground potential. The ground terminal 114*l* is supported by the resin body member 112. Part of the ground terminal 114*l* is embedded in the left end of the front side of the frame portion 112*b*, the left end of the rear side of the frame portion 112*b*, and the left side of the frame portion 112*b*. The ground terminal 114*l* is manufactured by bending a metal member. The material of the ground terminal 114*l* is, for example, a copper-based material, such as phosphor bronze. The structure of the ground terminal 114*r* and the structure of the ground terminal 114*l* are bilaterally symmetrical, so the description of the structure of the ground terminal 114*r* is omitted.

Structure of Connector Set

Figure 8:
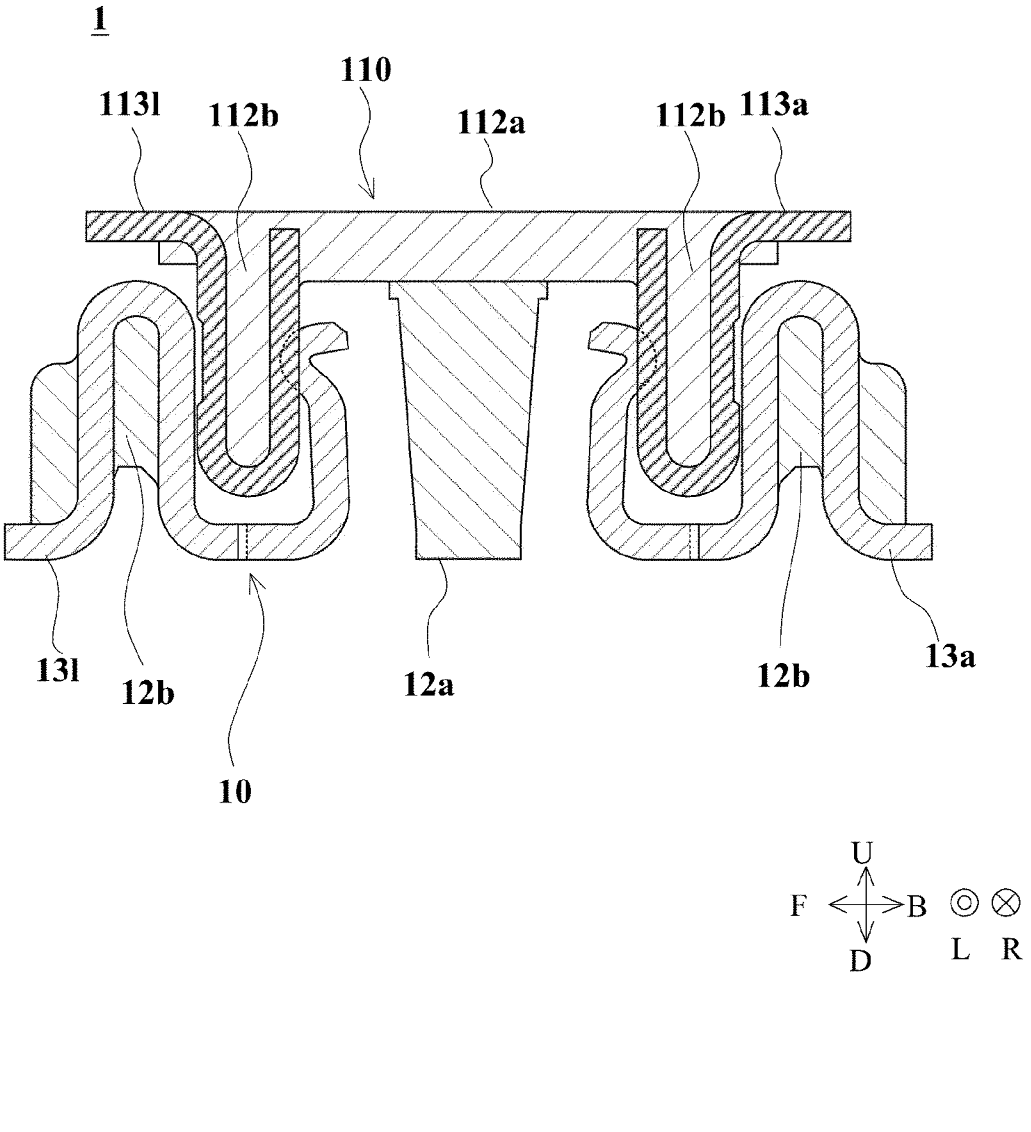
FIG. 8 is a cross-sectional view taken along the line A-A in FIG. 1.

Next, the structure of the connector set 1 will be described. FIG. 8 is a cross-sectional view taken along the line A-A in FIG. 1.

As shown in FIGS. 1 and 8, the frame portion 112*b* of the second connector 110 is inserted in a region surrounded by the frame portion 12*b* of the first connector 10. At this time, the protruding portion 12*a* of the first connector 10 is inserted in a region surrounded by the frame portion 112*b* of the second connector 110. Thus, the signal terminals 13*a* to 13*v* respectively contact with the signal terminals 113*a* to 113*v*. The ground terminals 14*l*, 14*r* respectively contact with the ground terminals 114*l*, 114*r*. Furthermore, the ground terminals 16*a*, 16*b* contact with the ground terminal 114*l*. The ground terminals 16*c*, 16*d* contact with the ground terminal 114*r*.

However, the floating terminals 15*l*, 15*r* do not contact with the signal terminals 113*a* to 113*v* or the ground terminals 114*l*, 114*r*. Thus, in a state where the second connector 110 is connected to the first connector 10 as well, the potential of each of the floating terminals 15*l*, 15*r* remains at a floating potential.

Advantageous Effects

With the first connector 10, the first connector 10 can be used in a high frequency band. More specifically, in the receptacle connector described in Japanese Unexamined Patent Application Publication No. 2006-331679, the receptacle member is a ground terminal. The receptacle member includes a first supported portion supported by the left end of the receptacle fitting portion and a second supported portion supported by the left end of the receptacle outer wall portion. The first supported portion and the second supported portion are coupled to each other. Therefore, the first supported portion corresponds to the floating terminal 15*l*. The second supported portion corresponds to the ground terminal 14*l*. Therefore, the receptacle connector described in Japanese Unexamined Patent Application Publication No. 2006-331679 has a structure in which the ground terminal 14*l* and the floating terminal 15*l* of the first connector 10 are coupled. In this case, a capacitance tends to be formed between the first supported portion and each signal terminal. As a result, a resonant frequency that is generated in the receptacle connector decreases. Therefore, it is difficult to use the receptacle connector described in Japanese Unexamined Patent Application Publication No. 2006-331679 in a high frequency band.

For this reason, in the first connector 10, the floating terminal 15*l* is not connected to any of terminals of the first connector 10 including the plurality of signal terminals 13*a* to 13*v* and the ground terminals 14*l*, 14*r* when viewed in the up and down direction. Thus, the potential of the floating terminal 15*l* is a floating potential. In this case, a capacitance is difficult to be formed between the floating terminal 15*l* and each of the signal terminals 13*a* to 13*v*. As a result, a resonant frequency that is generated in the first connector 10 tends to increase. Thus, with the first connector 10, the first connector 10 can be used in a high frequency band.

With the first connector 10, the floating terminal 15*l* covers at least part of the left end of the protruding portion 12*a* when viewed in the up and down direction. Thus, the left end of the protruding portion 12*a* is protected by the floating terminal 15*l*. As a result, when the second connector 110 is connected to the first connector 10, contact of the ground terminal 114*l* with the left end of the protruding portion 12*a* is suppressed. As described above, with the first connector 10, breakage of the protruding portion 12*a* is reduced.

With the first connector 10, the first connector 10 is usable in a high frequency band additionally depending on the following reason. More specifically, when viewed in the up and down direction, the through-hole H1 extending through the coupling portion 12*c* in the up and down direction is provided in at least part of a region between the first part 14*la* and the floating terminal 15*l*. Thus, air is present in the region between the first part 14*la* and the floating terminal 15*l*. Therefore, the dielectric constant of the region between the first part 14*la* and the floating terminal 15*l* decreases. Thus, a capacitance is difficult to be formed between the first part 14*la* and the floating terminal 15*l*. As a result, a resonant frequency that is generated in the first connector 10 tends to decrease. Thus, with the first connector 10, the first connector 10 can be used in a high frequency band.

With the first connector 10, a misalignment is difficult to occur in the positional relationship between the ground terminal 14*l* and the floating terminal 15*l*. More specifically, the ground terminal 14*l* includes the ground protrusion 14*lf* protruding into the through-hole H1 when viewed in the up and down direction. When viewed in the up and down direction, the floating terminal 15*l* includes the floating protrusion 15*ld* protruding into the through-hole H1. The ground protrusion 14*lf* and the floating protrusion 15*ld* are arranged in the right and left direction. Thus, the first connector 10 is able to be assembled by the following procedure. Initially, the ground terminal 14*l* and the floating terminal 15*l* are set in a state where the ground protrusion 14*lf* and the floating protrusion 15*ld* are coupled. Then, the ground terminal 14*l* and the floating terminal 15*l* are insert-molded to form the resin body member 12. After that, the ground protrusion 14*lf* and the floating protrusion 15*ld* are cut at the through-hole H1. In this way, the resin body member 12 is formed in a state where the ground terminal 14*l* and the floating terminal 15*l* are united, with the result that a misalignment is difficult to occur in the positional relationship between the ground terminal 14*l* and the floating terminal 15*l*.

In the first connector 10, the width of the first part 15*la* in the front and rear direction is greater than the width of the floating protrusion 15*ld* in the front and rear direction. In other words, the width of the floating protrusion 15*ld* in the front and rear direction is less than the width of the first part 15*la* in the front and rear direction. Therefore, a capacitance is difficult to be formed in the floating protrusion 15*ld*.

In the first connector 10, the first part 15*la* and the second part 15*lb* are not coupled on the left surface or the front surface of the protruding portion 12*a*. The first part 15*la* and the third part 15*lc* are not coupled on the left surface or the rear surface of the protruding portion 12*a*. An area in which the floating terminal 15*l* and the ground terminal 14*l* are opposed to each other reduces. As a result, a capacitance to be formed between the floating terminal 15*l* and the ground terminal 14*l* reduces.

In the first connector 10, the first part 15*la* provides a function to guide the ground terminal 114*l*, so it is desirable that the width of the first part 15*la* in the front and rear direction be large. On the other hand, from the viewpoint of reducing a capacitance to be generated in the first connector 10, it is desirable that the width of the second part 15*lb* in the right and left direction and the width of the third part 15*lc* in the right and left direction be small. For this reason, the width of the first part 15*la* in the front and rear direction is greater than any of the width of the second part 15*lb* in the right and left direction and the width of the third part 1*c* in the right and left direction. Here, the first part 15*la* and the second part 15*lb* are connected in series, and the first part 15*la* and the third part 15*lc* are connected in series. In this case, even when a capacitance that is generated in the first part 15*la* increases, a capacitance that is generated in the second part 15*lb* and a capacitance that is generated in the third part 15*lc* are small, so the resultant capacitance is suppressed to a smaller amount. Thus, with the first connector 10, while the floating terminal 15*l* functions to guide the ground terminal 114*l*, an increase in capacitance to be generated in the first connector 10 is suppressed.

OTHER EMBODIMENTS

The connector according to the present disclosure is not limited to the first connector 10 and may be changed within the scope of the purport of the present disclosure.

The ground terminals 14*r*, 16*a* to 16*d*, and the floating terminal 15*r* are not indispensable components.

In the specification, the annular shape is not limited to a complete ring and includes a partially cut-out ring. However, in the annular shape, the ratio of the cut-out part to the ring is lower than or equal to 20%.

The ground terminal 14*l* just needs to be opposed to the floating terminal 15*l* in the front and rear direction or in the right and left direction. Therefore, the ground terminal 14*l* may be configured so as to be opposed to the floating terminal 15*l* in the front and rear direction and not opposed to the floating terminal 15*l* in the right and left direction. The ground terminal 14*l* may be configured so as to be opposed to the floating terminal 15*l* in the right and left direction and not opposed to the floating terminal 15*l* in the front and rear direction.

The through-holes H1, Hr do not need to be provided.

The ground protrusion 14*lf* and the floating protrusion 15*ld* are not indispensable components.

The floating terminals 15*l*, 15*r* may be connected to the electrodes of the circuit board or may be configured not to be connected to the electrodes of the circuit board.

The first connector 10 may include any one of the set of signal terminals 13*a* to 13*k* and the set of signal terminals 13*l* to 13*v*.

What is claimed is:

1. A connector comprising:

a resin body member;

a plurality of signal terminals supported by the resin body member;

a ground terminal supported by the resin body member; and a floating terminal supported by the resin body member, wherein the resin body member includes a protruding portion extending in a right and left direction when viewed in an up and down direction, a frame portion having an annular shape surrounding the protruding portion when viewed in the up and down direction, and a coupling portion between the protruding portion and the frame portion when viewed in the up and down direction, the coupling portion coupling the protruding portion to the frame portion, the plurality of signal terminals is supported by the frame portion and arranged in the right and left direction in a region in front of or in back of the protruding portion, the floating terminal covers at least part of a left end of the protruding portion when viewed in the up and down direction and is not connected to any of terminals of the connector, including the plurality of signal terminals and the ground terminal, the ground terminal is supported by the frame portion and opposed to the floating terminal in a front and rear direction or in the right and left direction, the ground terminal includes a first part opposed to the floating terminal in the right and left direction, the connector further comprises a through-hole extending through the coupling portion in the up and down direction in at least part of a region between the first part and the floating terminal when viewed in the up and down direction, the ground terminal includes a ground protrusion protruding into the through-hole when viewed in the up and down direction, the floating terminal includes a floating protrusion protruding into the through-hole when viewed in the up and down direction, and the ground protrusion and the floating protrusion are arranged in the right and left direction.

2. The connector according to claim 1, wherein the floating terminal includes a first part opposed to the ground terminal in the right and left direction, and a floating protrusion extending in a leftward direction from a lower end of the first part, and a width of the first part in the front and rear direction is greater than a width of the floating protrusion in the front and rear direction.

3. The connector according to claim 1, wherein the floating terminal includes a first part on a top surface and a left surface of the protruding portion, a second part extending in a forward direction from the first part and on the front surface of the protruding portion, and a third part extending in a rearward direction from the first part and on a rear surface of the protruding portion.

4. The connector according to claim 3, wherein the first part and the second part are not coupled on the left surface or the front surface of the protruding portion, and the first part and the third part are not coupled on the left surface or the rear surface of the protruding portion.

5. The connector according to claim 3, wherein a width of the first part in the front and rear direction is greater than any of a width of the second part in the right and left direction and a width of the third part in the right and left direction.

6. The connector according to claim 2, wherein the floating terminal includes a first part on a top surface and a left surface of the protruding portion, a second part extending in a forward direction from the first part and on the front surface of the protruding portion, and a third part extending in a rearward direction from the first part and on a rear surface of the protruding portion.

7. The connector according to claim 6, wherein the first part and the second part are not coupled on the left surface or the front surface of the protruding portion, and the first part and the third part are not coupled on the left surface or the rear surface of the protruding portion.

8. The connector according to claim 4, wherein a width of the first part in the front and rear direction is greater than any of a width of the second part in the right and left direction and a width of the third part in the right and left direction.

* * * * *